(12) United States Patent
Park et al.

(10) Patent No.: US 9,469,929 B2
(45) Date of Patent: Oct. 18, 2016

(54) DOUBLE DAMPER OF WASHING MACHINE

(71) Applicant: LG ELECTRONICS INC., Seoul (KR)

(72) Inventors: Won Seok Park, Seoul (KR); Dae Hun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/380,356

(22) PCT Filed: Feb. 22, 2013

(86) PCT No.: PCT/KR2013/001434
§ 371 (c)(1),
(2) Date: Aug. 21, 2014

(87) PCT Pub. No.: WO2013/125898
PCT Pub. Date: Aug. 29, 2013

(65) Prior Publication Data
US 2015/0069684 A1 Mar. 12, 2015

(30) Foreign Application Priority Data

Feb. 22, 2012 (KR) .......................... 10-2012-0018041

(51) Int. Cl.
*D06F 37/20* (2006.01)
*F16F 15/08* (2006.01)
(Continued)

(52) U.S. Cl.
CPC .............. *D06F 37/20* (2013.01); *F16F 13/005* (2013.01); *F16F 15/022* (2013.01);
(Continued)

(58) Field of Classification Search
CPC ........ D06F 37/20; D06F 37/24; F16F 7/087; F16F 7/09; F16F 13/005

USPC ....... 267/196, 134, 136, 137, 140.13, 141.1; 188/381; 68/23.1, 23.3
See application file for complete search history.

(56) References Cited

U.S. PATENT DOCUMENTS

| | | | |
|---|---|---|---|
| 4,537,382 A | * | 8/1985 | Beck ........................ F16F 15/02 210/380.2 |
| 5,117,659 A | * | 6/1992 | Sharp ...................... D06F 37/24 248/568 |

(Continued)

FOREIGN PATENT DOCUMENTS

| | | |
|---|---|---|
| CN | 1221050 A | 6/1999 |
| CN | 1572965 A | 2/2005 |

(Continued)

OTHER PUBLICATIONS

Korean Notice of Allowance dated Oct. 10, 2013 issued in Application No. 10-2012-0018041.

(Continued)

*Primary Examiner* — Thomas Irvin
(74) *Attorney, Agent, or Firm* — Ked & Associates LLP

(57) ABSTRACT

A double damper of a washing machine, which is a double damper, comprising: a rod 2 which is extensively connected between upper and lower support ends 1a and 1b; and a suspension cap 3 which is provided in the middle of the rod 2, is supported by a spring 4 disposed between the lower support end 1b and a holder of the suspension cap 3, and decreases vibration by moving vertically along the rod 2, wherein the suspension cap 3 has a first damper 5 fixed to the suspension cap 3 and a second damper 6 reciprocating along the rod 2, and a cap 7 in which the first and second dampers 5 and 6 are provided is integrally formed with the suspension cap 3 and is vertically divided by a partition bar 8.

5 Claims, 5 Drawing Sheets

(51) Int. Cl.
*F16F 13/00* (2006.01)
*F16F 15/02* (2006.01)
*F16F 15/04* (2006.01)
*D06F 37/24* (2006.01)
*F16F 7/09* (2006.01)
*F16F 7/08* (2006.01)

(52) U.S. Cl.
CPC ............ *F16F 15/046* (2013.01); *F16F 15/08* (2013.01); *D06F 37/24* (2013.01); *F16F 7/087* (2013.01); *F16F 7/09* (2013.01)

(56) References Cited

U.S. PATENT DOCUMENTS

| | | | | |
|---|---|---|---|---|
| 5,887,455 A * | 3/1999 | Kim | ................ | D06F 37/24 248/613 |
| 5,946,946 A * | 9/1999 | Sharp | ................ | D06F 37/20 188/129 |
| 6,397,643 B1 * | 6/2002 | Chang | ................ | D06F 37/24 68/23.1 |
| 6,474,113 B1 * | 11/2002 | Park | ................ | D06F 37/24 68/23.3 |
| 6,591,640 B2 * | 7/2003 | Park | ................ | D06F 37/24 68/23.3 |
| 7,428,954 B2 * | 9/2008 | Park | ................ | F16F 7/09 188/322.17 |
| 9,279,207 B2 * | 3/2016 | Yu | ................ | D06F 37/22 |
| 2002/0190448 A1 * | 12/2002 | Park | ................ | D06F 37/24 267/136 |
| 2011/0247372 A1 * | 10/2011 | Miller | ................ | D06F 37/12 68/13 R |
| 2015/0123522 A1 * | 5/2015 | Park | ................ | D06F 37/268 312/228 |
| 2015/0191860 A1 * | 7/2015 | Sim | ................ | D06F 37/265 68/23.3 |

FOREIGN PATENT DOCUMENTS

| | | |
|---|---|---|
| JP | H 06-063291 A | 3/1994 |
| JP | 2003-159494 A | 6/2003 |
| KR | 10-1998-0027998 A | 7/1998 |
| KR | 20-2000-0018292 U | 10/2000 |
| KR | 10-2005-0050902 A | 6/2005 |
| KR | 20-0410220 Y1 | 3/2006 |
| KR | 20-2010-0008696 U | 9/2010 |
| KR | 10-2011-0033605 A | 3/2011 |

OTHER PUBLICATIONS

International Search Report dated Apr. 24, 2013 issued in Application No. PCT/KR2013/001434 (with English translation).
Chinese Office Action issued in Application No. 201380021252.6 dated Dec. 9, 2015.

* cited by examiner (A) (Down)

(B) (Up)

(C)

(Down)

(D)

(Up)

DOUBLE DAMPER OF WASHING MACHINE

CROSS-REFERENCE TO RELATED PATENT APPLICATIONS

This application is a U.S National Stage Application under 35 U.S.C. 5371 of PCT Application No. PCT/KR2013/001434, filed Feb. 22, 2013, which claims priority to Korean Patent Application No. 10-2012-0018041, filed Feb. 22, 2012, whose entire disclosures are hereby incorporated by reference.

TECHNICAL FIELD

The present invention relates to a double damper of a washing machine, and more particularly, to a double damper of a washing machine which can efficiently control a tub by absorbing vibration due to large and small loads on the tub.

BACKGROUND ART

As well known in the art, washing machines for washing clothes are designed to absorb vibration generated by a tub in washing by supporting the tub with four-point dampers, that is, the dampers supporting the tub of washing machines reduce vibration generated by the tub rotating by absorbing it and provide retaining force for supporting the tub, such that there is no need of additional retaining members such as a suspension.

Dampers supporting a damper in washing machines were designed to attenuating front-rear movement of a load elastically supported by a spring with oil and a spring in the related art, but the dampers in the washing machines cannot efficiently absorb and reduce vibration when large and small loads are applied to the tub rotating and generate large noise, so the washing machines operate with noise.

Further, the vibration depends on the weight of the clothes to be washed and the operations of changing the damping force are unclear and influence each other, such that it is difficult to achieve complete attenuation of vibration due to large and small loads.

DISCLOSURE

Technical Problem

Accordingly, the present invention has been made to solve the problems in the related art and an object of the present invention is to provide a double damper of a washing machine which can provide high quality of a washing machine capable of washing clothes with small noise by reducing vibration noise of the washing machine, by generating damping forces in accordance with large and small loads, when strokes of a tub changes in accordance with the weight of clothes to be washed.

Technical Solution

In order to achieve the object of the present invention, a double damper of a washing machine includes a rod extending between upper and lower support ends and a suspension cap provided in the middle of the rod, elastically supported by a spring, and vertically moving along the rod, in which the suspension cap has a first damper fixed to the suspension cap and a second damper reciprocating along the rod, and the first and second dampers are doubly divided by a partition bar.

In order to achieve the object of the present invention, a double damper of a washing machine includes: a rod extending between an upper support end and a lower support end; a suspension cap vertically moving along the rod with vibration of a tub; a spring elastically supporting the suspension cap, between the lower support end and the suspension cap; a first damper fixed with respect to the suspension cap, vertically moving along the rod integrally with the suspension cap, and generating a friction force with the rod; a second damper vertically moving along the rod, generating a friction force with the rod, and changing a relative position to the suspension cap; and a cap moving integrally with the suspension cap and having a partition bar dividing the area where the first damper is disposed and the area where the second damper is disposed.

The first damper may be made of high-density polyurethane or rubber.

The second damper may be made of high-density polyurethane or rubber.

The cap may have a base disposed opposite to the partition bar with the second damper therebetween, the second damper may move between the partition bar and the base, and the second damper may move in contact with the partition bar or the base.

Alternatively, a double damper of a washing machine includes: a rod extending between an upper support end and a lower support end; a suspension cap vertically moving along the rod with vibration of a tub; a spring elastically supporting the suspension cap, between the lower support end and the suspension cap; a first damper fixed with respect to the suspension cap, vertically moving along the rod integrally with the suspension cap, and generating a friction force with the rod; and a second load vertically moving along the rod, generating a friction force with the rod, fixed with respect to the rod when a stroke of the tub is smaller than a predetermined amount, and vertically moving along the rod when a stroke of the tub is larger than the predetermined amount.

The double damper of a washing machine may further include a cap moving integrally with the suspension cap and having a partition bar dividing the area where the first damper is disposed and the area where the second damper is disposed.

The first damper may be fixed with respect to the cap.

When a stroke of the tub is larger than the predetermined amount, the relative positions of the second damper and the cap may change, and when a stroke of the tub is larger than the predetermined amount, the second damper and the cap may integrally move.

The cap may have a partition bar formed between the first damper and the second damper and the second damper may be pushed with respect to the partition bar.

The first damper may be made of high-density polyurethane or rubber.

The second damper may be made of high-density polyurethane or rubber.

Advantageous Effects

According to the double damper of a washing machine of the present invention, the first and second dampers individually and generally attenuate vibration generated by a tub of a washing machine in accordance with large and small loads on the tub, so vibration is attenuated in accordance with loads on the tub. Therefore, it is possible to provide a high-quality washing machine that washes clothes with little noise.

MODE FOR INVENTION

Hereinafter, preferred embodiments of the present invention will be described in detail with reference to the accompanying drawings.

Figure 1:
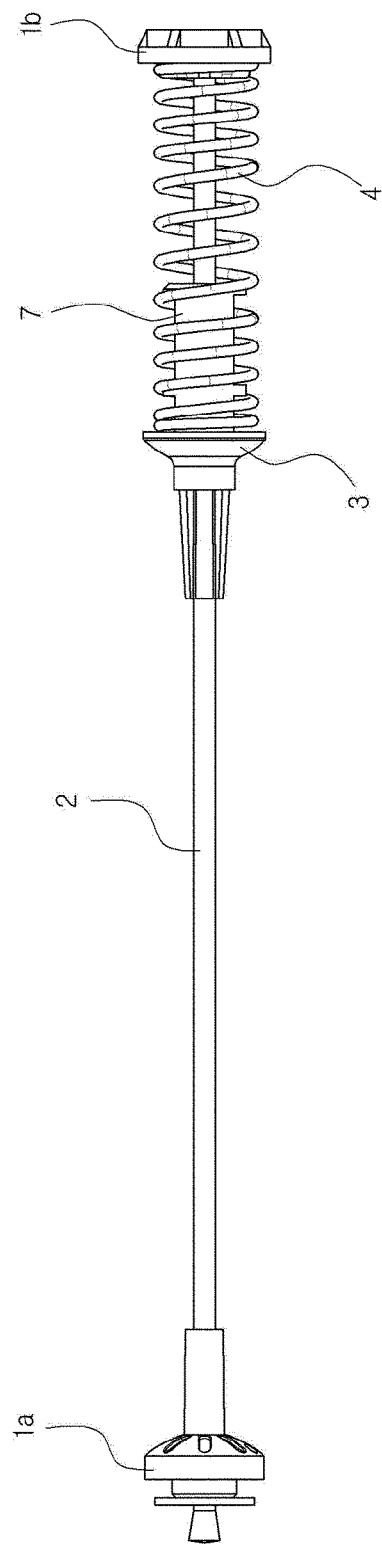
FIG. 1 is a front view of a double damper of a washing machine according to the present invention.
Figure 2:
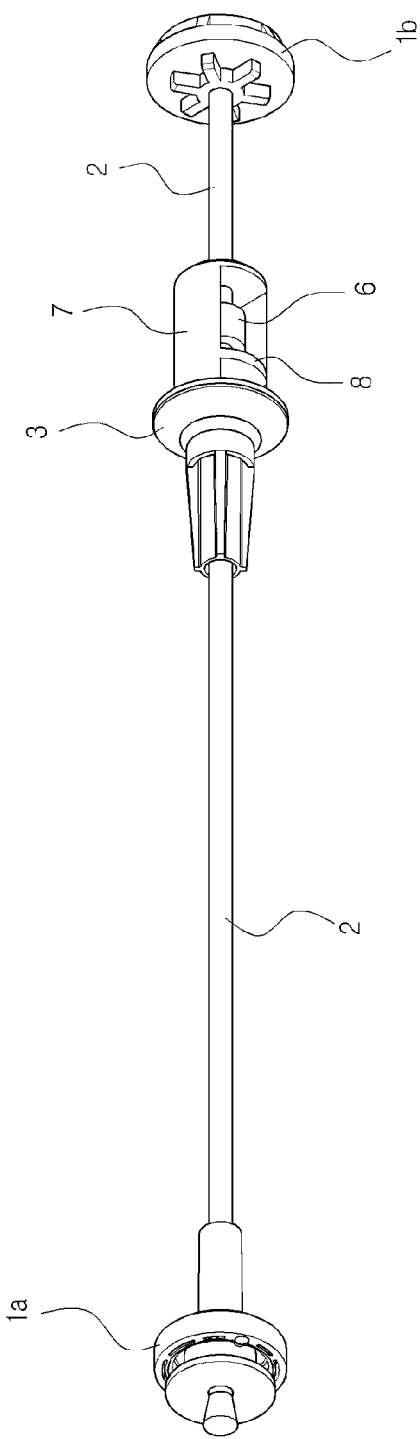
FIG. 2 is a perspective view of the double damper with spring of FIG. 1 removed.
Figure 3:
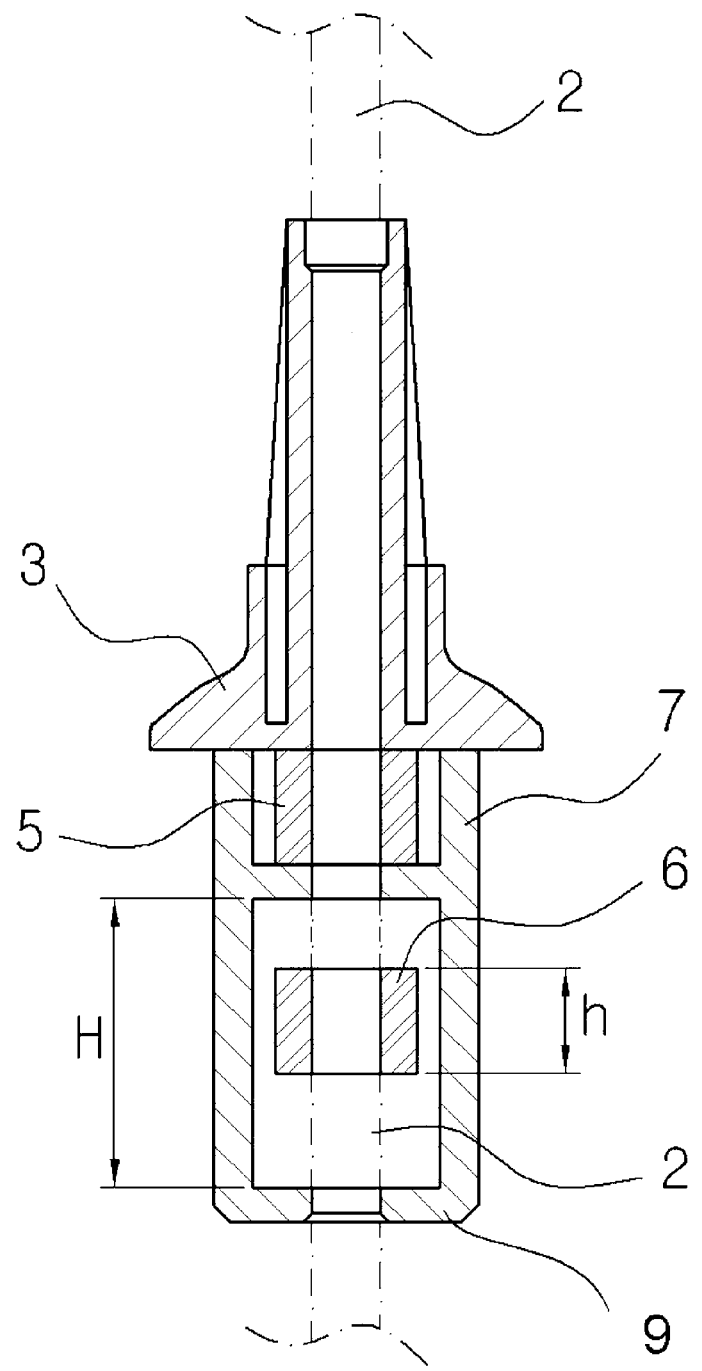
FIG. 3 is an exploded perspective view of a suspension cap that is a main part of the present invention.

FIGS. 1 to 3 are a front view, a partial perspective view, and an enlarged cross-sectional view which show a double damper of a washing machine according to the present invention.

The present invention provides a double damper of a washing machine which can double adjust a suspension damping force in accordance with the load on a tub in a washing machine when clothes are washed. As shown in the figures, the double damper includes a rod 2 which is extensively connected between upper and lower support ends 1a and 1b and a suspension cap 3 which is provided in the middle of the rod 2, is supported by a spring 4 disposed between the lower support end 1b and a holder of the suspension cap 3, and decreases vibration by moving vertically along the rod 2, in which the suspension cap 3 has a first damper 5 fixed to the suspension cap 3 and a second damper 6 reciprocating along the rod 2, and a cap 7 in which the first and second dampers 5 and 6 are provided is integrally formed with the suspension cap 3 and is vertically divided by a partition bar 8.

The second damper 6 reciprocates on the rod 2 and prevents friction noise with the cap 7 due to a large stroke by a large load, using its elasticity.

The first and second dampers 5 and 6 separated by the partition bar 8 of the cap 7 are different in inner diameter, but have the same cylindrical outer shape, and they are made of high-density polyurethane or rubber.

The cap 7 has a base 9 opposite to the partition bar 8 with the second damper 6 therebetween and the second damper 6 moves between the partition bar 8 and the base 9. The second damper 6 is pushed up by the base 9 and pushed down by the partition bar 8. Obviously, when the stroke of a tub is larger than a predetermined amount, the partition bar 8 or the base 9 and the second damper 6 are brought in contact with each other, and in this case, the second damper 6 is fixed to the rod 2.

The operation of the present invention having this structure is described.

Figure 4:
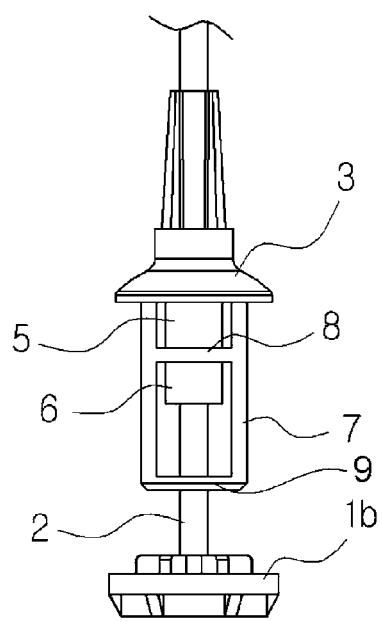
FIGS. 4A and 4B are views showing the operation of the suspension cap under a large load on a washing machine.
Figure 4:
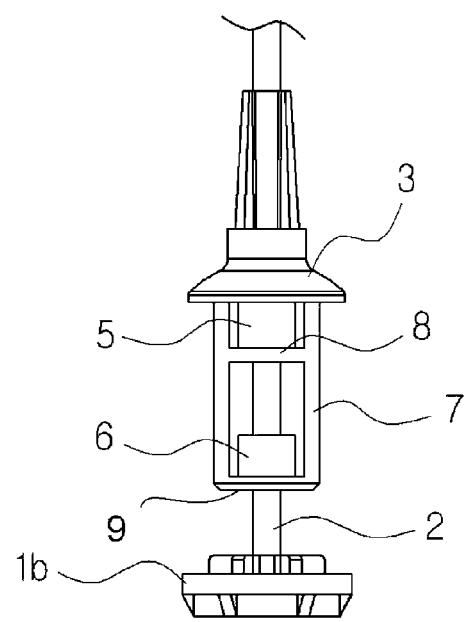
Figure 5:
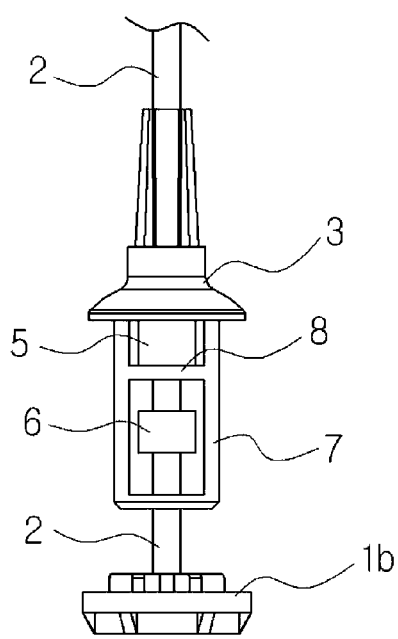
FIGS. 5C and 5D are views showing the operation of the suspension under a small load on a washing machine.
Figure 5:
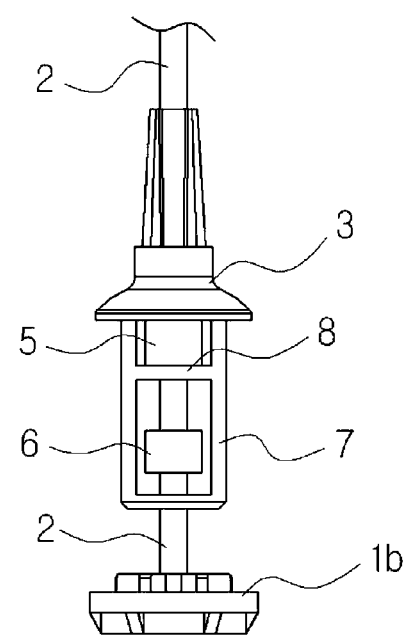

When a large load is applied on a tube in washing clothes, that is, when the stroke of a tub is larger than a predetermined amount (for example, stroke of a tube over 20 mm), a large damping force of the suspension cap 3 is generated, as shown in FIGS. 4A and 4B to control large vibration of the tub, in which both of the first damper 5 and the second damper 6 of the cap 7 are operated, so the vibration of the tub is efficiently attenuated and controlled.

In contrast, when there is a small amount of clothes to be washed and a small load is applied to a tube in washing, that is, when the stroke of a tub is less than a predetermined amount (for example, stroke of a tub under 20 mm), the tub is in a stable state with little vibration, so the suspension cap 3 generates a small damping force of the damper 5 and does not generate a large damping force of the damper 6, and accordingly, the washing machine operate with less noise.

The invention claimed is:

1. A double damper of a washing machine, comprising:
a rod extending between an upper support end and a lower support end;
a suspension cap movably coupled to the rod, wherein the rod penetrates the suspension cap and the suspension cap moves upward and downward along the rod in response to a vibration of a tub;
a spring elastically supporting the suspension cap, between the lower support end and the suspension cap;
a first damper configured to move along the rod and generate a friction force with the rod;
a second damper movably coupled to the rod and configured to generate a friction force with the rod; and
a cap protruded from the suspension cap in a downward direction and provided inside the spring, the cap having a pair of through holes formed respectively at an upper end and a lower end thereof, wherein the cap has an inner space defined therein,
wherein the rod extends through the pair of through holes of the cap, the cap includes a partition bar which is provided between the upper and lower ends of the cap and divides the inner space into an upper area and a lower area, wherein the first damper is housed within the upper area and the second damper is housed within the lower area,
wherein the second damper engages the partition bar of the cap when the spring is deformed greater than a predetermined amount, disengages from the partition bar of the cap as the spring is restored from a deformed state of the predetermined amount, remains disengaged from both the partition bar and the lower end of the cap, and engages with the lower end of the cap as the spring is further restored, and
wherein the cap includes an opening at its lateral side, to communicate the lower area with an outside of the cap.

2. The double damper of claim 1, wherein, the first damper is made of high-density polyurethane or rubber.

3. The double damper of claim 1, wherein the second damper is made of high-density polyurethane or rubber.

4. The double damper of claim 1, wherein the first damper is fixed with respect to the cap.

5. The double damper of claim 1, wherein the spring completely surrounds the cap.

* * * * *